(12) United States Patent
Okuwaki

(10) Patent No.: US 6,619,551 B2
(45) Date of Patent: Sep. 16, 2003

(54) HAND-HELD SCANNER HAVING X AND Y MOVING MEANS

(75) Inventor: Daisaku Okuwaki, Yamanashi-ken (JP)

(73) Assignee: Citizen Electronics Co., Ltd., Fujiyoshida (JP)

( * ) Notice: Subject to any disclaimer, the term of this patent is extended or adjusted under 35 U.S.C. 154(b) by 0 days.

(21) Appl. No.: 09/964,952

(22) Filed: Sep. 28, 2001

(65) Prior Publication Data

US 2002/0040932 A1 Apr. 11, 2002

(30) Foreign Application Priority Data

Oct. 6, 2000 (JP) ........................................ 2000-308515

(51) Int. Cl.[7] ................................................. G06K 7/10
(52) U.S. Cl. ............................. 235/472.01; 235/462.45
(58) Field of Search ....................... 235/472.01, 472.02, 235/454, 462.45, 462.49

(56) References Cited

U.S. PATENT DOCUMENTS

| | | | |
|---|---|---|---|
| 4,793,812 A | * | 12/1988 | Sussman et al. ........ 235/472.01 |
| 5,111,005 A | * | 5/1992 | Smith et al. ................. 178/19 |
| 5,355,146 A | * | 10/1994 | Chiu et al. ................. 345/156 |
| 5,850,289 A | * | 12/1998 | Fowler et al. .............. 350/376 |
| 6,270,013 B1 | * | 8/2001 | Lipman et al. ............. 235/454 |

FOREIGN PATENT DOCUMENTS

| | | | |
|---|---|---|---|
| DE | 3628139 | | 6/1988 |
| DE | 4107018 | | 12/1991 |
| FR | 2586497 | * | 2/1987 ............ G11B/7/13 |

* cited by examiner

*Primary Examiner*—Daniel St. Cyr
(74) *Attorney, Agent, or Firm*—Dennison, Schultz & Dougherty

(57) ABSTRACT

A hand scanner has a linear image sensor provided for reading an image. An X-roller is disposed in an X-direction and a Y-roller is disposed in a Y-direction perpendicular to the X-direction. A spherical ball is provided to project a part thereof from an opening. The X-roller and the Y-roller are urged to the spherical ball. Angular positions of the X-roller and Y-roller are detected so as to provide coordinate signals.

5 Claims, 6 Drawing Sheets

HAND-HELD SCANNER HAVING X AND Y MOVING MEANS

BACKGROUND OF THE INVENTION

The present invention relates to a hand scanner which is used for computers, facsimiles and others for reading images.

Since the hand scanner is manually moved for reading an image, it is advantageous to read images on filed papers or in a book.

FIG. 6 is a plan view showing a conventional hand scanner, and FIG. 7 is a sectional side view of the scanner.

Referring to FIGS. 6 and 7, a hand scanner 50 has a case 51 in which a roller 52 is rotatably mounted and a linear image sensor 55 is provided. The axis of the roller is disposed in the Y-direction, and the periphery of the roller projected from an opening 51a and mounted on a printed sheet 60. The linear image sensor 55 comprises a plurality of optical sensors such as the CCDs which are aligned in the Y-direction within the width W.

The shaft of the roller 52 is connected to an encoder disk 53 through gears. The rotation of the encoder disk 53 is converted to an electric signal by a photointerrupter 54.

The scanner having the width W larger than the width of the printed sheet is used. The roller 52 is manually moved on the printed sheet 60 in the X-direction. The rotation of the roller 52 is converted into an electric signal by the photo-interrupter 54 as a travel distance of the scanner. During the movement of the scanner, outputs of the CCDs are sequentially transferred by a shift register (not shown) to read an image on the sheet 60.

There is no problem in the case where the width W is larger than the width of the printed sheet 60. However, if the width of the sheet is larger than the width W of the scanner, it is difficult to read the image on the sheet.

Referring to FIG. 8, the width of a printed sheet 61 is larger than the width W of the scanner 50. In order to read an image 56, the scanner must separately scan an upper portion 61a and a lower portion 61b. First the upper portion 61a is read out, and then the lower portion 61b is read out.

The image data of the upper portion 61a and the lower portion 61b are once stored in a computer or a facsimile machine. However, since the width w of an overlap portion 61c is unknown, the overlap portion can not be erased. Therefore, when the read out images are printed, upper image 56a and lower image 56b are printed as it is as shown in FIG. 10. Consequently, the images 56a and 56b must be corrected by composition of both images.

The composition operation will be described hereinafter with reference to FIG. 9. After scanning the upper portion 61a and the lower portion 61b at steps S11 and S12, it is determined whether the composition is executed after the printing of the images at a step S13. If it is the case, the images are printed at a step S14. The overlap portion is cut off, and both sheets are manually joined at a step S15 to form the original image. It should be noted that when image data are stored in the facsimile machine, the program inevitably proceeds to the step S14 from the step S13.

When the image data are composed before printing, the program proceeds to a step S16, where the image data may be composed by software in a computer system and by a manual difficult operation.

As described above, in the conventional scanner, when scanning a paper sheet having a larger width than the scanner, it is necessary to execute difficult manual operation to compose separate images to an original image.

SUMMARY OF THE INVENTION

An object of the present invention is to provide a hand scanner which may compose image data to an original image without manual operation.

According to the present invention, there is provided a hand scanner having an image reading portion in which a linear image sensor is provided for reading an image on a paper sheet, comprising, an X-roller disposed in an X-direction, a Y-roller disposed in a Y-direction perpendicular to the X-direction, both the X-roller and Y-roller being disposed in a horizontal plane, a spherical ball contacted with the X-roller and the Y-roller and provided to be contacted with the paper sheet, first detector means for detecting an angular position of the X-roller to produce an X-position signal for determining an X-coordinate, second detector means for detecting an angular position of the Y-roller to produce a Y-position signal for determining a Y-coordinate on the paper sheet.

In an aspect of the invention, the scanner further comprises urging means for urging the spherical ball to the X-roller and Y-roller so that both the rollers are rotated together with the spherical ball.

Each of the first and second detector means comprises an encoder disk provided on a shaft of either of the X- and Y-rollers and a photointerrupter for detecting an angular position of a corresponding encoder disk.

The X-roller, Y-roller and the spherical ball may be disposed adjacent the image reading portion.

The urging means comprises a roller and a spring for urging the roller to the spherical ball.

These and other objects and features of the present invention will become more apparent from the following detailed description with reference to the accompanying drawings.

DETAILED DESCRIPTION OF THE PREFERRED EMBODIMENT

Figure 1:
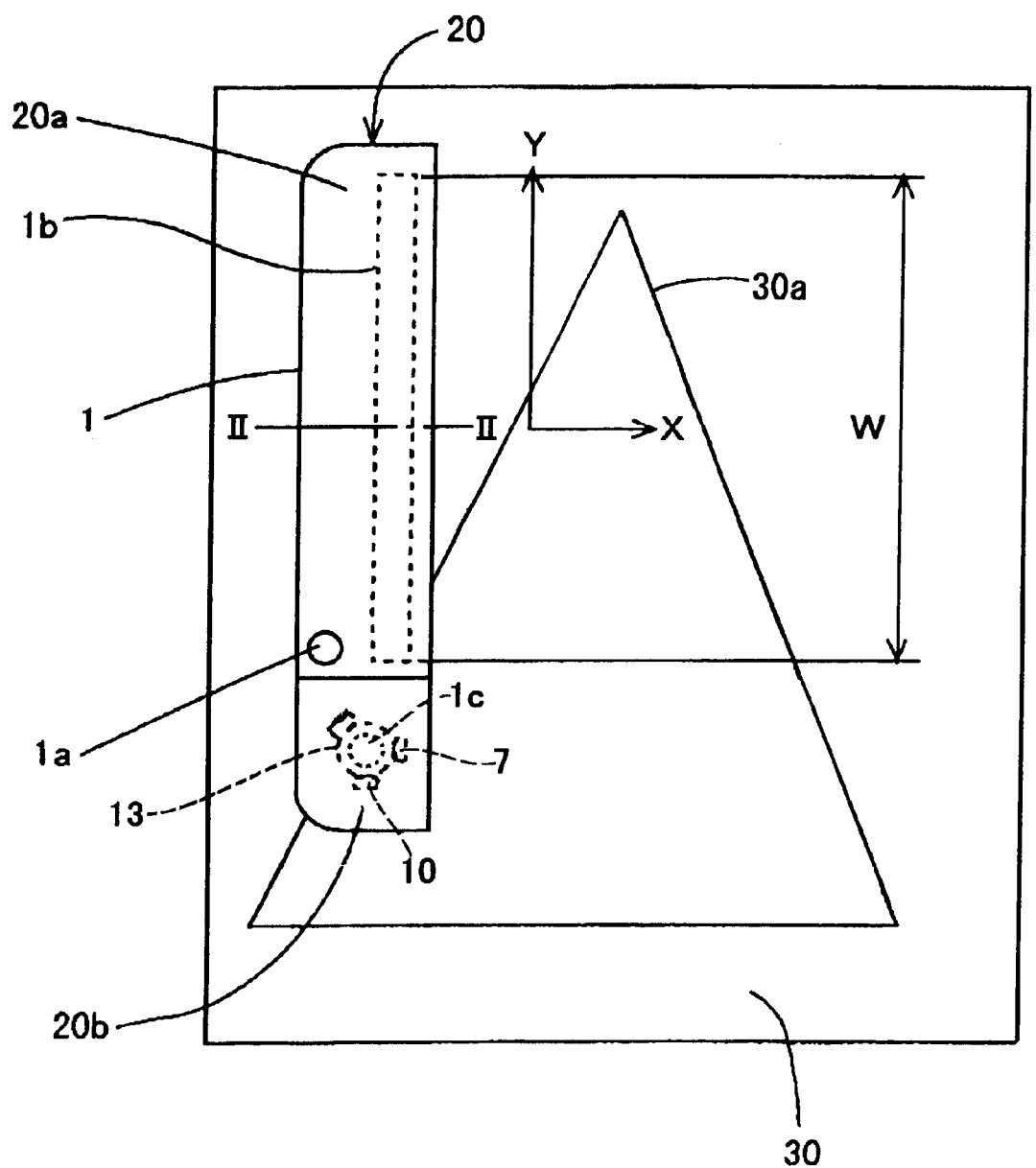
FIG. 1 is a plan view showing a hand scanner of the present invention and a printed sheet to be scanned.
Figure 2:
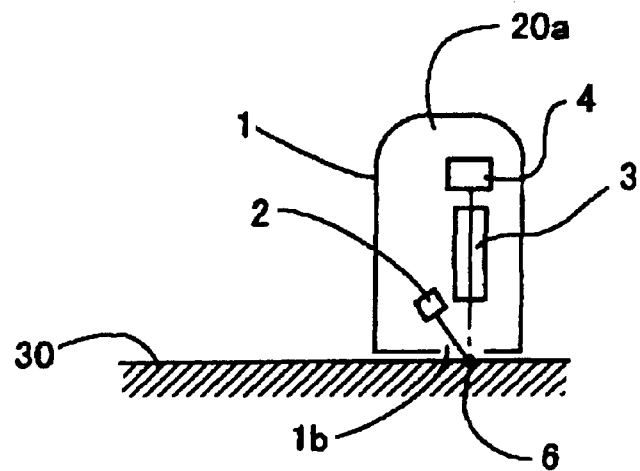
FIG. 2 is a schematic sectional side view of the hand scanner taken along a line II—II of FIG. 1.

Referring to FIGS. 1 and 2 showing a hand scanner of the present invention, the hand scanner 20 comprises an image reading portion 20a elongated in the Y-direction and a coordinate detecting portion 20b provided in a case 1. The coordinate detecting portion 20b is disposed adjacent the image reading portion 20a at an end in the longitudinal direction of the case 1. In the image reading portion 20a, there is provided a light source 2, lens array 3, and a linear image sensor 4. The linear image sensor 4 comprises plurality of CCDs arranged in the Y-direction so as to read an image 30a on a printed sheet 30 through the lens array 3. The lens array 3 comprises a plurality of cylindrical lenses arranged in the Y-direction so as to execute the image formation of each part of the image 30a at an image reading position 6 through an opening 1b. On the upper plate of the case 1, a start switch button 1a is provided for starting the reading operation of the image reading portion 20a.

Figure 3:
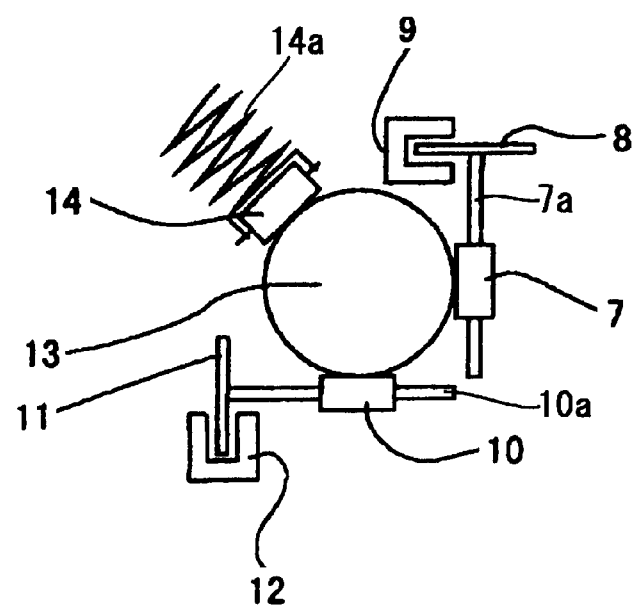
FIG. 3 is a schematic plan view showing an essential part of the hand scanner.

In the coordinate detecting portion 20b, a spherical ball 13 is provided to be contacted to the printed sheet 30 through an opening 1c. As shown in FIG. 3, an X-roller 7 and a Y-roller 10 are disposed in a horizontal plane and provided to be contacted with the ball 13. The X-roller 7 is disposed in the Y-direction and rotatably supported by a shaft 7a. The Y-roller 10 is disposed in the X-direction and rotatably supported by a shaft 10a. A spring roller 14 is urged by a spring 14a toward the ball 13 so that the ball 13 is pressed against the X-roller 7 and Y-roller 10. An X-encoder disk 8 is fixed to an outer end of the shaft 7a, and a Y-encoder disk 11 is fixed to an outer end of the shaft 10a. An X-photointerrupter 9 and a Y-photointerrupter 12 are disposed adjacent the corresponding disks 8 and 11 so as to detect the angular position and the number of rotations of each disk, thereby detecting an angular position of each of the X and Y-directions.

Scanning operation will be described hereinafter. In the case where the width of the image 30a is smaller than the width W of scanner, the image can be read by the single stoke of the scanner 20. When the width of the image 30a is larger than the width W of the scanner 20 and smaller than the double of the width W as shown in FIG. 1, the image is read out by two strokes of the scanner.

Figure 4:
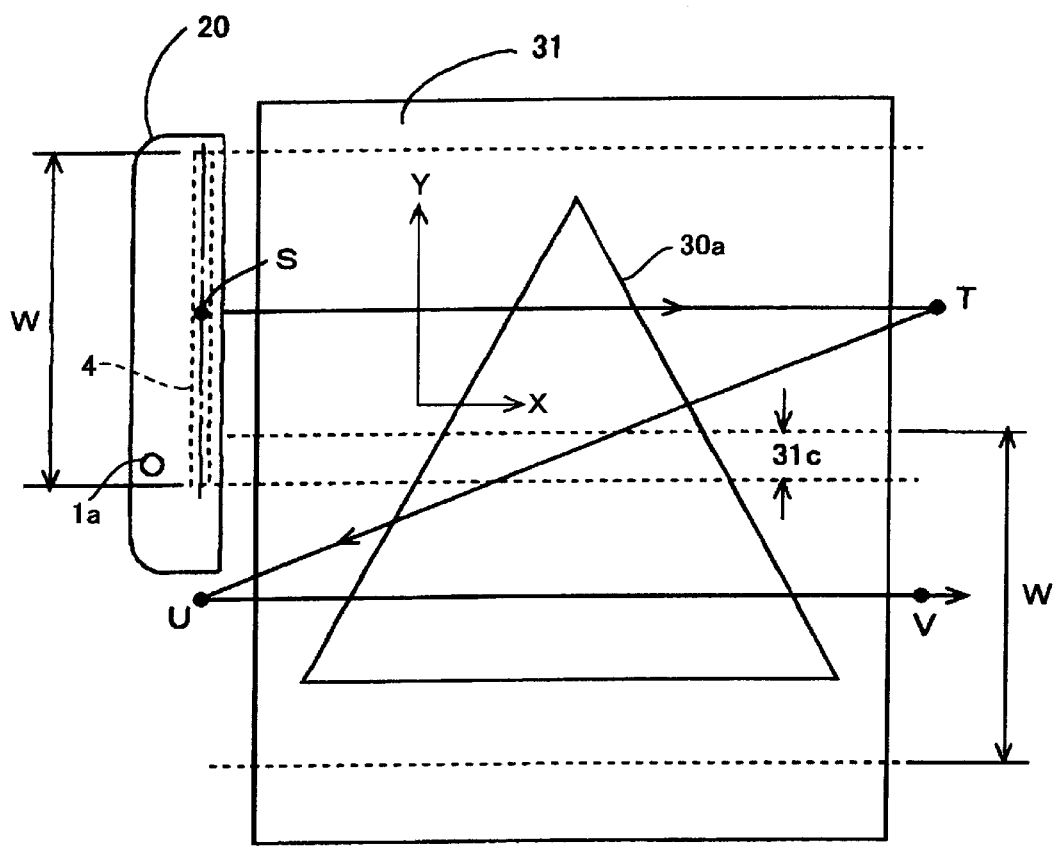
FIG. 4 is a plan view showing an operation for scanning a large size paper sheet.

FIG. 4 shows one of the scanning operations. The scanner 20 is positioned at a start point S. The start switch 1a is depressed and the scanner is manually moved in the X-direction, so that the image 30a is read out by the linear image sensor 4. The computer software in the computer or the facsimile machine counts the output pulses of the X-photointerrupter 9 to sequentially produce an X-position signal for determining X-coordinates by an image processing program provided in the computer or facsimile machine. If the scanner 20 does not deviate in the Y-direction, the Y-photointerrupter produces a constant Y-position signal, thereby providing a constant Y-coordinate. If the scanner deviates in the Y-direction, the Y-photointerrupter produces a Y-positioning signal dependent on the deviation, thereby providing changed Y-coordinates.

When the hand scanner 20 reaches to an end point T, the start switch 1a is again depressed to stop the reading of the image. Thus, the upper portion of the image 30a is read. Then the scanner is moved along an oblique line of FIG. 4. When the scanner reaches to a point U, the start switch 1a is depressed to start the reading of the image, and then the scanner is moved in the X-direction. When the scanner reaches to an end point V, the start switch 1a is depressed, thereby terminating the reading operation. Thus, the lower portion of the image is read.

Figure 5:
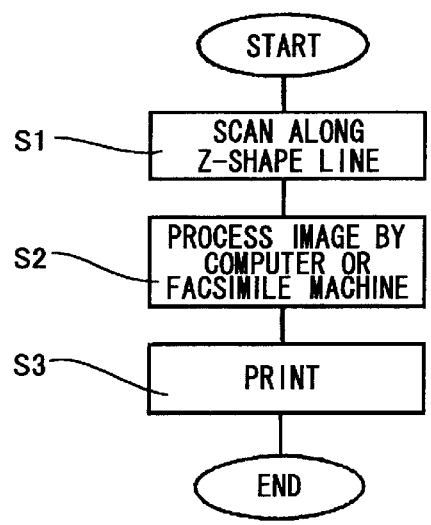
FIG. 5 is a flowchart showing operating steps of the hand scanner.
Figure 6:
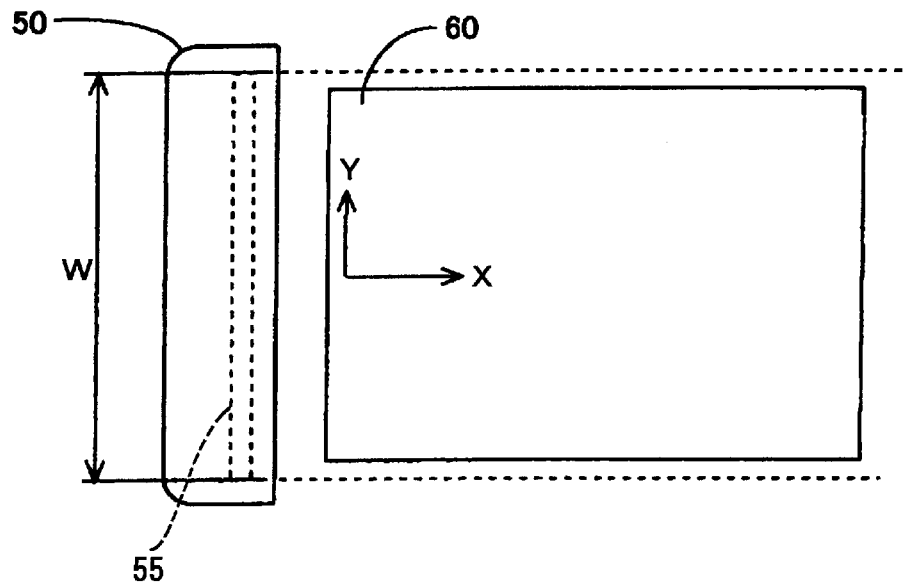
FIG. 6 is a plan view showing a conventional hand scanner.
Figure 7:
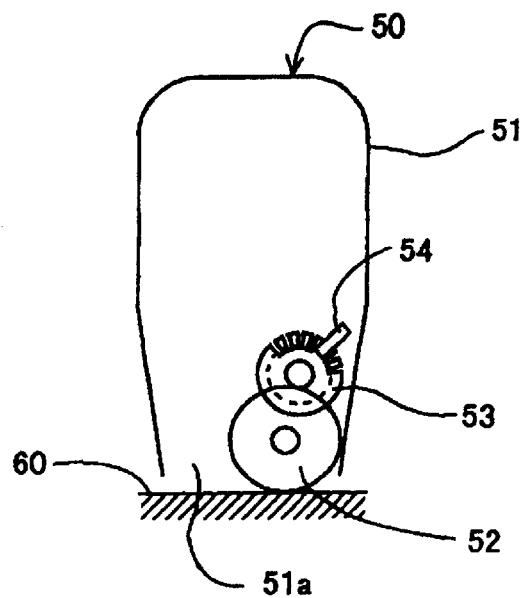
FIG. 7 is a sectional side view of the hand scanner.
Figure 8:
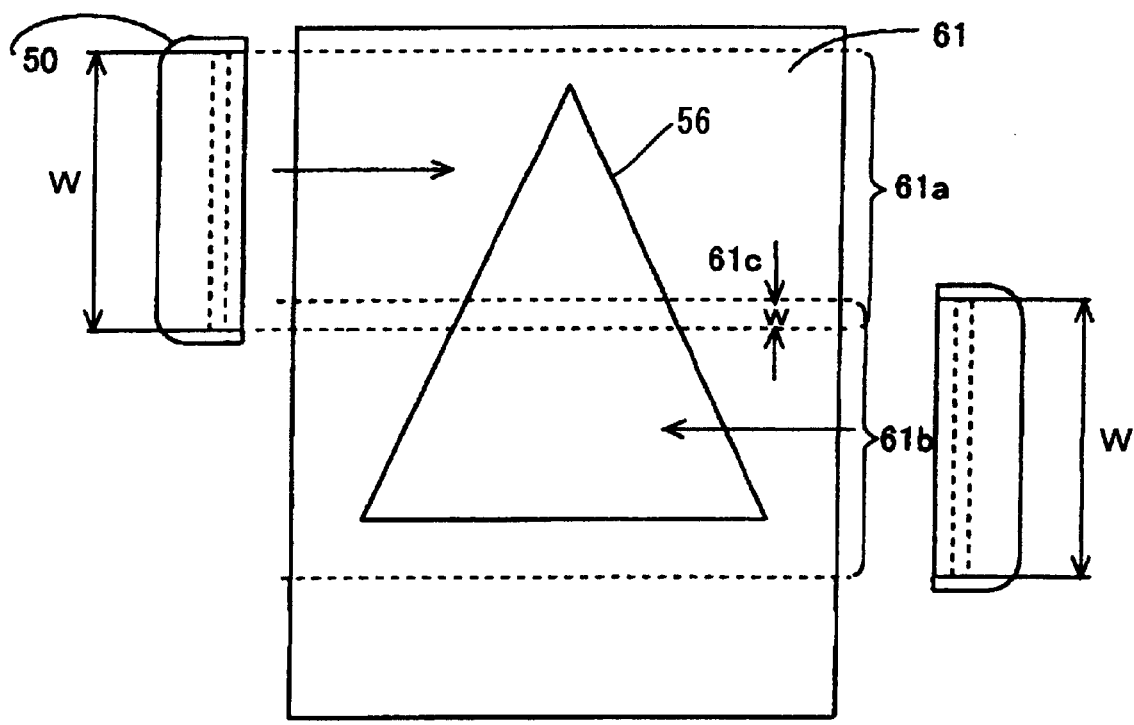
FIG. 8 is a plan view showing an operation for scanning a large size paper sheet.
Figure 9:
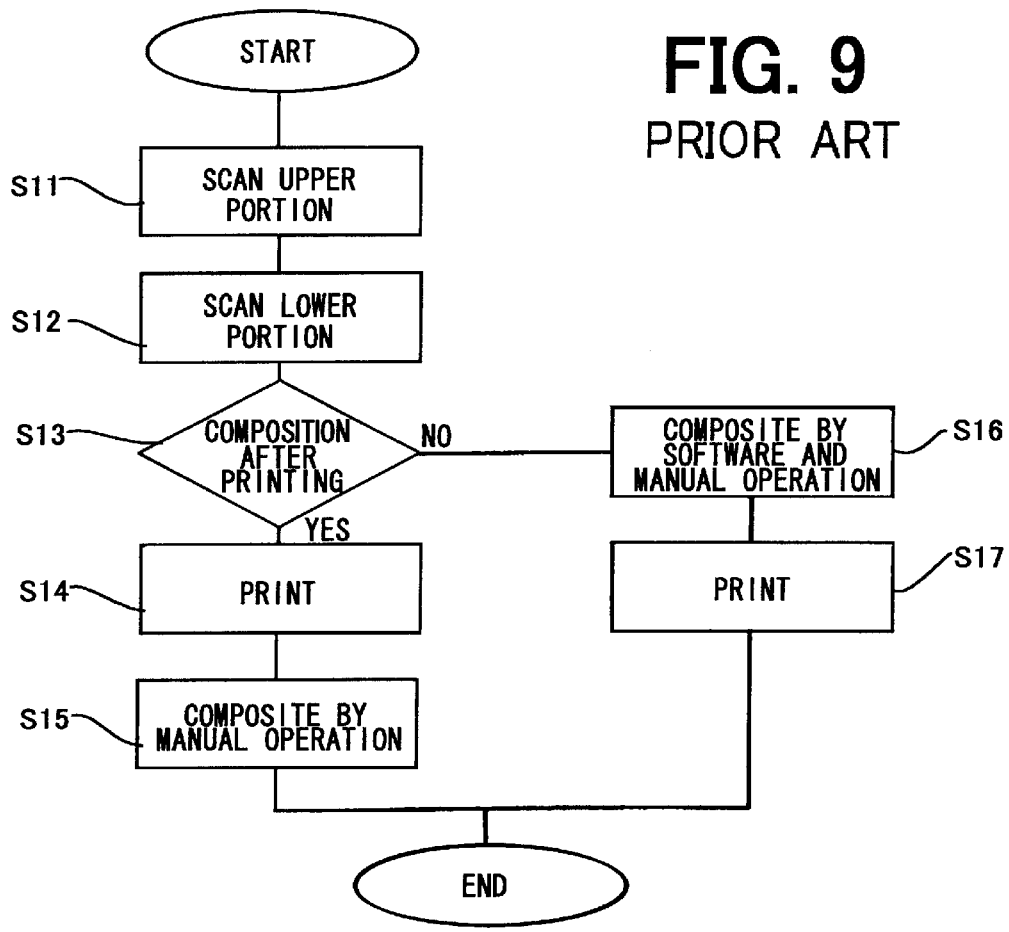
FIG. 9 is a flowchart showing operating steps of the hand scanner.
Figure 10:
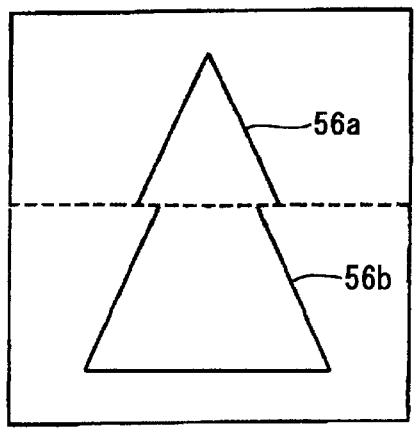
FIG. 10 is a plan view showing a printed image obtained by the conventional hand scanner.

As described above, the scanner is moved along a Z-shape line. Positions of points S, T, U and V and the inclination angle of the oblique line between points T and U are arbitrarily selected so as to form an overlap portion 31c. The overlap portion 31c is corrected by image processing program based on the detected X-coordinate and Y-coordinate to form an image same as the original image 30a. Thereafter, the composite image is printed. FIG. 5 shows the above described operating steps.

As another scanning method, the scanner may be moved from point T to point V and moved from point V to U in the counter direction. This method reduces the moving distance of the scanner and the image processing time.

In accordance with the present invention, an image having a width larger than the width of the scanner can be read without manual operation, and a composite image without deviation at an overlap portion can be obtained by processing the overlap portion based on detected X-coordinate and Y-coordinate.

While the invention has been described in conjunction with preferred specific embodiment thereof, it will be understood that this description is intended to illustrate and not limit the scope of the invention, which is defined by the following claims.

What is claimed is:

1. A hand scanner having an image reading portion having a linear image sensor for reading an image on a paper sheet, comprising:

an X-roller disposed in a Y-direction;

a Y-roller disposed in a X-direction perpendicular to the Y-direction;

both the X-roller and the Y-roller being disposed in a horizontal plane;

a spherical ball in contact with the X-roller and the Y-roller and wherein the spherical ball is also configured to contact the paper sheet;

first detector means for detecting an angular position of the X-roller to produce an position signal for determining an X-coordinate;

second detector means for detecting an angular position of the Y-roller to produce a Y-position signal for determining a Y-coordinate on the paper sheet; and a start switch for starting and stopping the operating of the linear image sensor at a start point and at an end point in a predetermined scanning direction.

2. The hand scanner according to claim 1 further comprising urging means for urging the spherical ball to the X-roller and Y-roller so that both the rollers are rotated together with the spherical ball.

3. The hand scanner according to claim 2 wherein the urging means comprises a roller and a spring for urging the roller to the spherical ball.

4. The hand scanner according to claim 1 wherein each of the first and second detector means comprises an encoder disk provided on a shaft of either of the X- and Y-rollers and a photointerrupter for detecting an angular position of a corresponding encoder disk.

5. The hand scanner according to claim 1 wherein the X-roller, Y-roller and the spherical ball are disposed adjacent the image reading portion.

* * * * *